(12) United States Patent
Doi

(10) Patent No.: US 7,377,630 B2
(45) Date of Patent: May 27, 2008

(54) INK-JET INK SETS, INK-JET INK TANKS, INK-JET RECORDING METHODS, AND INK-JET RECORDING APPARATUSES

(75) Inventor: Takatsugu Doi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 435 days.

(21) Appl. No.: 11/067,837

(22) Filed: Feb. 28, 2005

(65) Prior Publication Data

US 2006/0061640 A1   Mar. 23, 2006

(30) Foreign Application Priority Data

Sep. 21, 2004  (JP)  ............................. 2004-274125
Jan. 24, 2005  (JP)  ............................. 2005-015708

(51) Int. Cl.
*G01D 11/00*  (2006.01)
(52) U.S. Cl. ...................... 347/100; 347/95; 523/160
(58) Field of Classification Search ................ 347/100, 347/95, 96, 101; 106/31.6, 31.27, 31.13; 523/160

See application file for complete search history.

(56) References Cited

U.S. PATENT DOCUMENTS

| 2003/0055115 A1* | 3/2003 | Ninomiya et al. | .......... 523/160 |
| 2003/0069329 A1* | 4/2003 | Kubota et al. | .............. 523/160 |
| 2004/0131855 A1* | 7/2004 | Ganapathiappan | .......... 428/407 |

FOREIGN PATENT DOCUMENTS

| JP | 2667401 | 6/1997 |
| JP | 2002-331657 | 11/2002 |
| JP | 2002-331740 | 11/2002 |
| JP | 2003-055591 | 2/2003 |
| JP | 2003-172815 | 6/2003 |

\* cited by examiner

*Primary Examiner*—Manish S. Shah
(74) *Attorney, Agent, or Firm*—Fildes & Outland, P.C.

(57) ABSTRACT

An ink-jet ink set having a first liquid and a second liquid, wherein the first liquid includes a colored particle, a dispersant, a water-soluble solvent, and water, the second liquid includes a water-soluble solvent, water, a coagulant capable of coagulating or insolubilizing the first liquid, the colored particle has a core-shell structure in which a core part is coated with a shell part, the core part includes an uncolored component, and the shell part includes a colored component. An ink-jet ink tank, an ink-jet recording method and an ink-jet recording apparatus utilizing the ink-jet ink set.

20 Claims, 4 Drawing Sheets

INK-JET INK SETS, INK-JET INK TANKS, INK-JET RECORDING METHODS, AND INK-JET RECORDING APPARATUSES

CROSS-REFERENCE TO RELATED APPLICATION

This application claims priority under 35 USC 119 from Japanese patent Application Nos. 2004-274125 and 2005-15708, the disclosures of which are incorporated by reference herein.

BACKGROUND OF THE INVENTION

1. Field of the Invention

The present invention is concerned with ink-jet ink sets, ink-jet ink tanks, ink-jet recording methods, and ink-jet recording apparatuses.

2. Description of the Related Art

A lot of printers utilize the ink-jet recording method since the method can reduce the cost with compact apparatuses. In the ink-jet recording method, ink is ejected from the ink ejection opening formed by a nozzle, a slit, and porous film. Particularly, the piezo ink-jet method and the thermal ink-jet method are suitable for high-resolution, high-speed printing. The piezo ink-jet method utilizes deformation of a piezoelectric element for ejecting ink. The thermal ink-jet method utilizes boiling of ink upon application of thermal energy, for ejecting ink.

It has become an important issue to heighten the printing speed and printing quality on plain paper. A method has been proposed (for example in Japanese Patent No. 2667401) in order to realize the high-speed and high-quality printing on plain paper. In the method, a liquid including a compound having a cationic group is provided on the surface of a recording medium, the liquid penetrates into the recording medium, and an ink including an anionic dye is provided on the recording medium immediately after the liquid disappears from the surface of the recording medium (all the liquid has penetrated into the medium), so that an image is formed. In this method, however, the optical density of the image is insufficient in some cases if the ink drying time is short. Moreover, the long-term jetting property is insufficient in some cases if the drop amount is small.

An ink-jet colorant has been also proposed (for example, Japanese Patent Application Laid-Open (JP-A) Nos. 2003-55591 and 2003-172815) which comprises complex powdery particles having a particle size of 0.001 to 0.15 μm. This colorant has been proposed in order to improve the coloring property, vividness of the hue, dispersability, and light fastness. In the particles, extender pigment is coated with a uniform layer of an organic pigment. If the colorant is used for high-speed printing on plain paper, however, the optical density is insufficient in some cases.

Another image forming method has been also proposed (for example, in JP-A Nos. 2002-331657 and 2002-331740) in which ink including a colorant and a liquid composition including particles capable of reacting with the colorant are allowed to react on a recording medium. In the method: the particles and the colorant react in the mixture of the ink and the liquid composition; particles on the recording medium which have not been reacted with the colorant are still in the state of a dispersion; the colorant in the ink in a monomolecular state is adsorbed by the surface of the particles; the particles which have adsorbed the colorant aggregate; and the particles which have adsorbed the colorant are fixed to the surface of the recording medium. However, image properties such as the optical density is not improved in some cases when this method is used for high-speed printing.

As described above, the conventional methods fail to simultaneously satisfy the high color developability, suppressed unevenness in the solid image area, high optical density, suppressed feathering, suppressed intercolor bleed, short drying time, and long-term stability.

SUMMARY OF THE INVENTION

The present invention has been made in consideration of the above problems of the prior art.

An ink-jet ink set of the invention comprises a first liquid and a second liquid. The first liquid includes colored particles, a dispersant, a water-soluble solvent, and water. The second liquid includes a water-soluble solvent, water, and a coagulant capable of coagulating or insolubilizing the components in the first liquid. The colored particles have a core-shell structure in which the core part is coated with the shell part. The core part comprises an uncolored component. The shell part comprises a colored component.

The thickness of the shell part is preferably 100 nm or less. The ratio of the thickness of the shell part to the radius of the core part (the thickness of the shell part/the radius of the core part) is preferably in a range of 0.2 to 2.5. The ratio of the mass of the shell part to the mass of the core part (the mass of the shell part/the mass of the core part) is preferably in a range of 1 to 50. The uncolored component in the core part is preferably an inorganic substance or a polymer having a weight-average molecular weight of 10,000 or larger. The colored component in the shell part is preferably a pigment or a dye.

The first liquid preferably comprises a resin including a carboxylic acid group. The second liquid preferably comprises a colorant selected from the group consisting of a dye, a pigment having a sulfonic acid or sulfonate on its surface, and a self-dispersible pigment.

The volume-average particle size of the colored particles is preferably 30 nm to 250 nm.

The surface tension of the first liquid is preferably 20 mN/m to 60 mN/m. The surface tension of the second liquid is preferably 20 mN/m to 45 mN/m. The viscosities of the first and second liquids are preferably 1.2 mPa·s to 25.0 mPa·s. The number of particles having a size of 5 μm or larger in each of the first liquid and second liquid is preferably 1,000/μl or more.

The ink-jet ink tank of the invention contains the ink-jet ink set of the invention.

An ink-jet recording method of the invention uses the ink-jet ink set of the invention. The method comprising providing the first liquid and the second liquid on a recording medium so that the first and second liquids contact each other and form an image.

In the ink-jet recording method of the invention, the first and second liquids are provided on the recording medium in an amount of 25 ng or less per one drop. The ratio of the mass of the first liquid to be provided per pixel to the mass of the second liquid to be provided per pixel is preferably in a range of 1:10 to 10:1.

In the ink-jet recording method of the invention, the first liquid and second liquid may be supplied from the ink-jet ink tank of the invention and provided on the recording layer.

An ink-jet recording apparatus of the invention comprises a recording head which ejects respective liquids in the ink-jet ink set of the invention to a recording medium.

In the ink-jet recording apparatus, the amount of the first liquid to be provided is preferably 25 ng or less per one drop. The amount of the second liquid to be provided is preferably 25 ng or less per one drop. The ratio of the mass of the first liquid to be provided per pixel to the mass of the second liquid to be provided per pixel is preferably in a range of 1:10 to 10:1.

The ink-jet recording apparatus of the invention preferably includes the ink-jet ink tank of the invention which supplies the first and second liquids to the recording head.

DESCRIPTION OF THE PRESENT INVENTION

Figure 1:
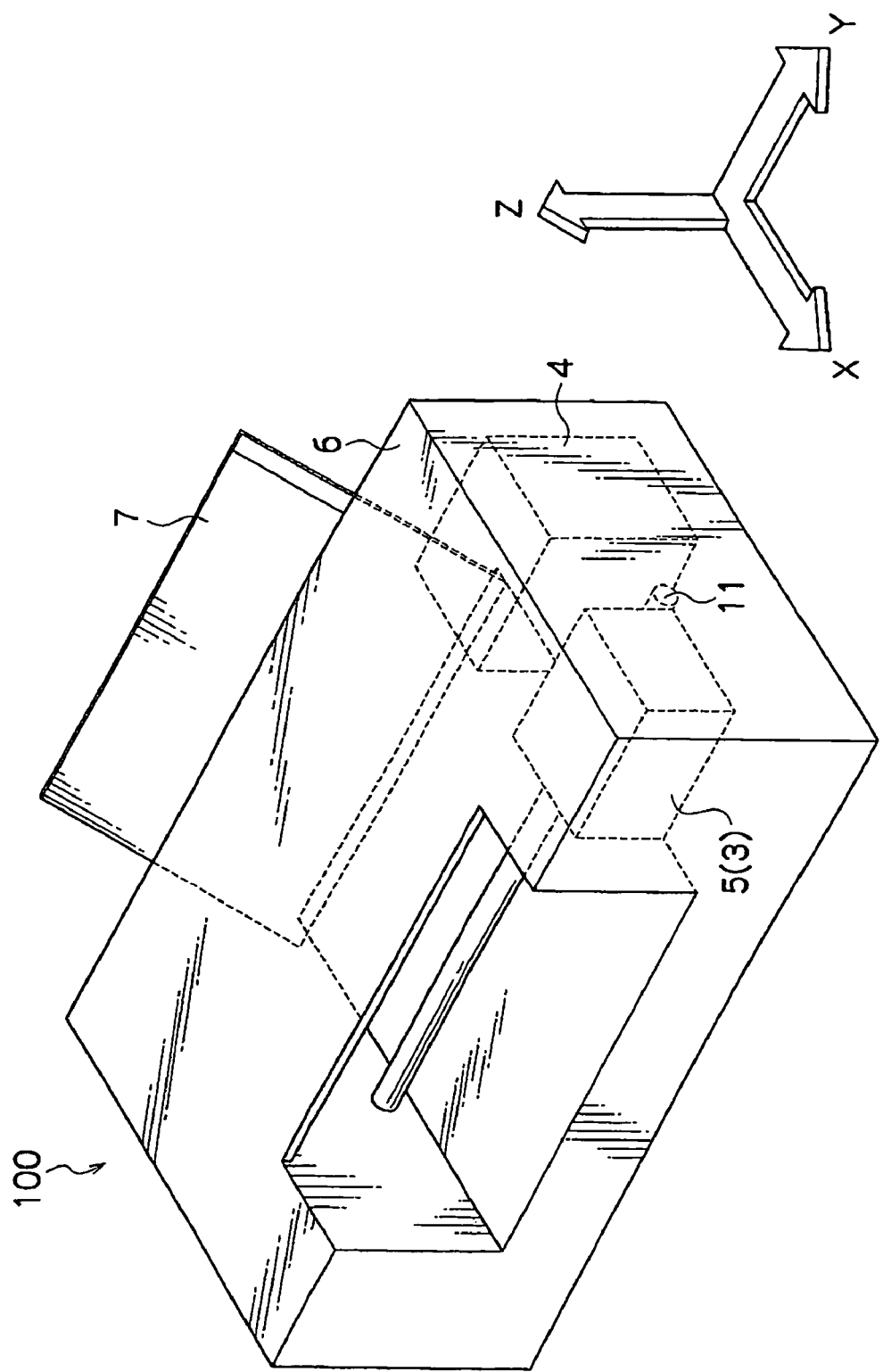
FIG. 1 is a perspective view illustrating the external constitution of a preferable embodiment of the ink-jet recording apparatus of the invention.

An ink-jet ink set of the invention comprises a first liquid and a second liquid. The first liquid includes colored particles (occasionally called "colorant" hereinafter), a dispersant, a water-soluble solvent, and water. The second liquid includes a water-soluble solvent, water, and a coagulant capable of coagulating or insolubilizing the components in the first liquid. The colored particles have a core-shell structure in which the core part is coated with the shell part. The core part comprises an uncolored component. The shell part comprises a colored component.

When the first liquid and the second liquid are used for printing on a recording medium so that the first liquid and the second liquid contact each other, properties such as the optical density, feathering, intercolor bleed, and drying time can be improved. The mechanism is not clear. However, the following explanation can be suggested: the colorant coagulates when the first liquid and the second liquid contact each other on the recording medium; the colorant aggregate separates from the solvent; and if the colorant coagulant is sufficiently larger than the space between the fibers of the recording medium, the colorant stays on the surface of the recording medium in a high density so that the optical density is high. Since the in-plane diffusion of the colorant aggregate on the surface of the sheet can be also suppressed, the feathering and intercolor bleed are also suppressed. Further, it is possible to reduce the drying time since the colorant aggregate and the solvent separate from each other and the solvent alone penetrates into the recording medium.

However, if conventional pigments and dyes are used as the colorant, in some cases, the color rendition degrades and unevenness occurs in solid image areas. This degradation in the color rendition is supposed to be caused by the absorption of light by the colorant aggregate, since the thickness of the layer of the pigment aggregate or the dye aggregate is significantly larger than the wavelength of the visible light. The unevenness in solid image areas occurs since the distribution of the colorant aggregate on the recording medium is uneven and there are local areas which have different optical densities.

In consideration of the above problem of the conventional pigments and dyes, the present invention uses a colored particles having a core-shell structure as the colorant wherein the core part comprises a uncolored component and the shell part comprises a colored component. By using the colored particles of the invention, the above problems such as the degradation in the color rendition and unevenness in solid image areas can be solved. The mechanism is not clear, but is supposed as follows.

As described above, the particle size of the aggregate has to be sufficiently larger than the space between the fibers of the recording medium in order to improve the optical density and to suppress bleed in the two-liquid reaction system. If the colored particles whose core part comprises an uncolored component are used as the colorant, excessive absorption of light by the colorant aggregate can be suppressed and the degradation in color rendition can be suppressed. Even if the distribution of the colorant on the recording medium is uneven, the difference in light absorption between the areas can be reduced since the colored particles of the invention do not absorb light excessively. As a result, the unevenness in solid image areas can be suppressed. Accordingly, the thickness of the colorant layer in the colorant aggregate is an important factor in suppressing the degradation in the color rendition and in improving the evenness in solid image areas. Other important factors include the thickness of the shell part of the colored particle, the ratio of the thickness of the shell part to the thickness of the core part, and the ratio of the mass of the shell part to the mass of the core part.

The first liquid will be described. The first liquid includes colored particles, a dispersant, a water-soluble solvent, and water.

The colored particles as the colorant have a core-shell structure in which the core part comprising an uncolored component is coated with the shell part comprising a colored component.

The uncolored component (occasionally called "core substance" hereinafter) in the core part may be an inorganic substance or a polymer having a weight-average molecular weight of 10,000 or larger. Examples of the polymer include poly(meth)acrylic acid, poly(meth)acrylate, polymethylmethacrylate, polyethylene glycol, polyester, polystyrene, polyethylene, polyvinyl alchohol, polyvinyl pyrrolidone, styrene-(meth)acrylic acid copolymer, latex, and plastic pigments. Examples of the inorganic substance include silica, alumina, titanium dioxide, zinc oxide, zirconia, clay, calcium cabonate, magnesium carbonate, barium sulfate, and pearl pigments such as titanium mica, hydrotalcite, and muscovite.

The core substance (uncolored component) is more preferably a polymer having a weight-average molecular weight of 10,000 or larger. Specifically, the polymer may be polymethylmethacrylate, polyethylene glycol, or polyester. If the core substance is a polymer, the fixability of the colorant on the recording medium tends to be improved. It is suggested that such a core substance has a function of adhering the colorant to the recording medium, thus improves fixability. Considering this tendency, the weight-average molecular weight of the polymer is preferably 10,000 to 5,000,000, more preferably, 30,000 to 1,000,000.

The colored component (occasionally called "shell substance" hereinafter) in the shell part may be a dye or a pigment, and is preferably a pigment. This is because the optical density and the light fastness can be improved when a pigment is used as the shell substance.

The pigment may be an organic pigment or an inorganic pigment. Examples of black pigment include carbon blacks such as furnace black, lamp black, acetylene black, and channel black. Examples of the pigments usable in the invention include black pigments, pigments of three primary colors such as cyan pigments, magenta pigments, and yellow pigments, pigments in specific colors such as red pigments, green pigments, blue pigments, brown pigments, and white pigments, metallic pigments such as pigments in gold color and pigments in silver color, and newly-synthesized pigments.

Specific examples of the pigment in the shell part include, but not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060 (these are manufactured by Columbian Carbon), REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300, MONARCH 1400 (these are manufactured by Cabot Corporation), Color Black FW1, Color Black FW2, Color Black FW2V, Color Black 18, Color Black FW200, Color Black S150, Color Black S160, Color Black S170, PRINTEX 35, PRINTEX U, PRINTEX V, PRINTEX 140U, PRINTEX 140V, Special Black 6, Special Black 5, Special Black 4A, Special Black 4 (these are manufactured by Degussa), No. 25, No. 33, No. 40, No. 47, No. 52, No. 900, No. 2300, MCF-88, MA600, MA7, MA8, and MA100 (these are manufactured by Mitsubishi Chemical Co., Ltd.).

Examples of the cyan pigment include, however not limited to, C. I. Pigment Blue-1, -2, -3, -15, -15:1, -15:2, -15:3, -15:4, -16, -22 and -60.

Examples of the magenta pigment include, however not limited to, C. I. Pigment Red -5, -7, -12, -48, -48:1, -57, -112, -122, -123, -146, -168, -184 and -202.

Examples of the yellow pigment include, however not limited to, C. I. Pigment Yellow -1, -2, -3, -12, -13, -14, -16, -17, -73, -74, -75, -83, -93, -95, -97, -98, -114, -128, -129, -138, -151, 154, -155 and -180.

The colorant in the shell part may be a pigment which is self-dispersible in water. The pigment which is self-dispersible in water refers to a pigment which has, on its surface, a lot of groups imparting solubility in water and which can be dispersed stably in water even in the absence of a polymer dispersant. Specifically, the pigment self-dispersible in water can be obtained by subjecting an usual pigment to a surface-modification treatment such as an acid-base treatment, a coupling treatment, a polymer-graft treatment, a plasma treatment, or an oxidation/reduction treatment.

The pigment which is self-dispersible in water may be a pigment which has been subjected to a surface-modification treatment recited above. Other examples of the pigment which is self-dispersible in water include commercially available self-dispersible pigments such as CAB-O-JET-200, CAB-O-JET-250, CAB-O-JET-260, CAB-O-JET-270, CAB-O-JET-300, IJX-444, and IJX-55 manufactured by Cabot Corporation, and Microjet Black CW-1 and CW-2 manufactured by Orient Chemical Industries, Ltd.

It is also possible to use, as the colorant, a pigment coated with a resin. This pigment is called microcapsule pigment. Examples of the microcapsule pigment usable in the invention include commercially available microcapsule pigments manufactured by Dainippon Ink and Chemicals Inc. and Toyo Ink Mfg. Co., Ltd. and microcapsule pigments specially prepared for the invention.

The dye in the shell part may be a water-soluble dye or a disperse dye. Examples of the water-soluble dye include C. I. Direct Black -2, -4, -9, -11, -17, -19, -22, -32, -80, -151, -154, -168, -171, -194, -195, C. I. Direct Blue -1, -2, -6, -8, -22, -34, -70, -71, -76, -78, -86, -112, -142, -165, -199, -200, -201, -202, -203, -207, -218, -236, -287, -307-, C. I. Direct Red -1, -2, -4, -8, -9, -11, -13, -15, -20, -28, -31, -33, -37, -39, -51, -59, -62, -63, -75, -80, -81, -83, -87, -90, -94, -95, -99, -101, -110, -189, -227, C. I. Direct Yellow -1, -2, -4, -8, -11, -12, -26, -27, -28, -33, -34, -41, -44, -48, -58, -86, -87, -88, -132, -135, -142, -144, -173, C. I. Food Black -1, -2, C. I. Acid Black -1, -2, -7, -16, -24, -26, -28, -31, -48, -52, -63, -107, -112, -118, -119, -121, -156, -172, -194, -208, C. I. Acid Blue -1, -7, -9, -15, -22, -23, -27, -29, -40, -43, -55, -59, -62, -78, -80, -81, -83, -90, -102, -104, -111, -185, -249, 254, C. I. Acid Red -1, -4, -8, -13, -14, -15, -18-, -21, -26, -35, -37, -52, -110, -144, -180, -249, -257, -289, C. I. Acid Yellow -1, -3, -4, -7, -11, -12, -13, -14, -18, -19, -23, -25, -34, -38, -41, -42, -44, -53, -55, -61, -71, -76, -78, -79, and C. I. Acid Yellow-122.

Specific examples of the disperse dyes include C. I. Disperse Yellow -3, -5, -7, -8, -42, -54, -64, -79, -82, -83, -93, -100, -119, -122, -126, -160, -184:1, -186, -198, -204, -224, C. I. Disperse Orange -13, -29, -31:1, -33, -49, -54, -66, -73, -119, -163, C. I. Disperse Red -1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356, -362, C. I. Disperse Violet -33, C. I. Disperse Blue -14, -26, -56, -60, -73, -87, -128, -143, -154, -165, -165:1, -176, -183, -185, -201, -214, -224, -257, -287, -354, -365, -368, C. I. Disperse Green -6:1 and -9.

The colored particles of the invention can be produced by: a method comprising generating a plasma of gas including a reactive gas, evaporating the shell substance in the plasma, bringing a core part into contact with the evaporated shell substance so that the shell substance is adhered to the surface of the core part; a method comprising adhering a polymer to the surface of the core part and further adhering the shell substance to the surface; a method comprising using a surface modification apparatus which utilizes a mechanochemical method such as an angstrom mill, a theta composer, a hybridizer, or a mechanomill; and a method utilizing the capsulation emulsion polymerization coagulation process such as the EA method. An example of the EA method is described below. A core particle liquid dispersion is prepared in which particles (occasionally called "core particles" hereinafter) of the core substance is dispersed. Also, a shell particle liquid dispersion is prepared in which particles (occasionally called "shell particles" hereinafter) of the shell substance is dispersed. A latex or a surfactant may be added to each liquid dispersion so as to stabilize the dispersion state. If the core particles (core part) are made of a polymer, the core particle liquid dispersion may be prepared by an emulsion-polymerization method. The shell particle liquid dispersion is added to the core particle liquid dispersion so as to adhere the shell particles to the surface of the core particles and to form a coating layer (shell part) having a desired thickness. In this way, colored particles having a core-shell structure can be prepared. In the preparation of the core particle liquid dispersion, the pH can be changed to cause coagulation and the primary coagulation product can be used as the core particles. A coagulant may be added during the preparation of the core particle liquid dispersion in order to enable rapid and stable coagulation or to obtain aggregate particles having a narrow particle size distribution. Also when the shell particles are allowed to adhere to the core particles, a pH change can be used for causing the coagulation or a coagulant may be added so as to enable rapid and stable coagulation or to obtain aggregate particles having a narrow particle size distribution. The latex, surfactant and coagulant may be respectively selected from the latexes, surfactants, and coagulants used in the EA method.

According to the invention, the volume-average particle size of the colored particles is preferably 30 nm to 250 nm. The volume-average particle size of the colored particles is calculated from the particle sizes of the colored particles if no additives are attached to the colored particles. However, if additives such as a dispersant are adhered to the colored particles, the volume-average particle size of the colored particles is calculated from the sizes of the whole particles including the additives. The volume-average particle size can be measured by a MICROTRACK UPA particle size analyzer 9340 (manufactured by Leeds & Northrup Co.). In the measurement, 4 ml of ink is put in the measurement cell and the measurement is conducted in accordance with the specified measuring protocol. Regarding the parameter inputted in the measurement, ink viscosity is inputted as the viscosity and the density of the colored particles is inputted as the density of the dispersed particles. The volume-average particle size is more preferably 60 nm to 250 nm, still more preferably 150 nm to 230 nm. If the volume-average particle size is less than 30 nm, the optical density is low in some cases. If the volume-average particle size is more than 250 nm, the storage stability cannot be maintained in some cases.

The thickness of the shell part of the colored particle is preferably 5 nm to 100 nm, more preferably 10 nm to 90 nm, still more preferably 25 nm to 75 nm. If the thickness of the shell part is more than 100 nm, the color rendition degrades in some cases.

The ratio (the thickness of the shell part/the radius of the core part) of the thickness of the shell part of the colored particle to the radius of the core part of the colored particle is preferably in a range of 0.2 to 2.5, more preferably in a range of 0.2 to 2, still more preferably in a range of 0.25 to 1. If the ratio is lower than 0.2, the optical density is insufficient in some cases. If the ratio is higher than 2.5, the color rendition degrades and unevenness occurred in solid image areas.

The ratio (the mass of the shell part/the mass of the core part) of the mass of the shell part of the colored particle to the mass of the core part of the colored particle is preferably in a range of 1 to 50, more preferably in a range of 5 to 40, still more preferably in a range of 10 to 40. If the ratio is lower than 1, sufficient optical density cannot be obtained in some cases. If the ratio is higher than 50, in some cases, the color rendition degrades and unevenness occurred in solid image areas. The radius of the core part and the thickness of the shell part can be measured by observing a section of the colored particle with a transmission electron microscope. In the measurement of the thickness of the shell part, the section of the colored particle is selected and observed which has a particle size within ±10% from the average particle size of the colored particles measured by the Coulter counter method.

The particle size and the particle size distribution parameters are measured by a COULTER COUNTER TA-II (manufactured by Beckman-Coulter, Inc.). In the measurement, ISOTON-II (manufactured by Beckman-Coulter, Inc.) is used as the electrolyte solution. The measurement method comprises: adding 0.5 to 50 mg of the sample to 2ml of a 5% aqueous solution of a surfactant (preferably sodium alkylbenzensulfonate) as a dispersant; adding the mixture to 100 to 150 ml of the electrolyte solution; dispersing the sample in the electrolyte solution for about one minute by using an ultrasonic dispersing apparatus; and measuring the particle size distribution of particles having particle sizes within 2 to 60 µm by using the COULTER COUNTER TA-II with an aperture of 100 µm, so as to obtain the volume-average particle size and number-average particle size. The volume-average particle size measured in this way is assumed as the average particle size of the colored particles.

The radius of the core part and the thickness of the shell part are determined by observing the boundary between the uncolored inner core part and the colored outer shell part. At least 20 colored particles in a microscopic field are observed and the average radius of the core part and the average thickness of the shell are measured. Further, the distributions of the radius and the thickness are also measured.

Specifically, the average radius of the core part and the average thickness of the shell part are measured as follows. Ten radial lines are drawn from the center of a colored particle image on the transmission electron microscope photograph, such that every pair of adjacent radial lines make the same angle (36 degree). The radius of the core part and the thickness of the shell part on each line are measured with a ruler. The average of the ten radii is considered as the radius of the core part of the colored particle and the average of the ten thicknesses is considered as the thickness of the shell part of the colored particle.

The ratio of the mass of the shell part to the mass of the core part is calculated on the basis of the determined radius of the core part and thickness of the shell part.

The colored particle is included in the first liquid in an amount of 0.1% by mass to 50% by mass, preferably 1% by mass to 10% by mass, based on the total mass of the first liquid. If the amount is less than 0.1% by mass, the optical density is insufficient in some cases. If the amount is more than 50% by mass, the jetting property of the liquid is unstable in some cases.

The first liquid may include a dispersant which improves the dispersion state of the colored particles. The dispersant may be a non-ionic compound, an anionic compound, a cationic compound or an amphoteric compound.

The dispersant may be a copolymer of monomers each having an α,β-ethylenic unsaturated group.

Examples of the monomer having an α,β-ethylenic unsaturated group include acrylic acid, methacrylic acid, crotonic acid, itaconic acid, monoester of itaconic acid, maleic acid, monoester of maleic acid, fumaric acid, monoester of fumaric acid, vinylsulfonic acid, styrenesulfonic acid, sulfonated vinylnaphthalene, vinyl alcohol, acrylamide, methacryloxyethyl phosphate, bismethacryloxyethyl phosphate, methacryloxyethylphenyl acid phosphate, ethylene glycol dimethacrylate, diethylene glycol dimethacrylate, styrene derivatives such as styrene, α-methylstyrene and vinyltoluene, vinylcyclohexane, vinylnaphthalene, vinylnaphthalene derivatives, alkylacrylate, phenylacrylate, alkylmethacrylate, phenylmethacrylate, cycloalkylmethacrylate, alkyl crotonate, dialkyl itaconate and dialkyl maleate.

The dispersant may be a homopolymer of a monomer selected from the above monomers or a copolymer of monomers selected from the above monomers. Specific examples thereof include styrene/styrenesulfonic acid copolymers, styrene/maleic acid copolymers, styrene/methacrylic acid copolymers, styrene/acrylic acid copolymers, vinylnaphthalene/maleic acid copolymers, vinylnaphthalene/methacrylic acid copolymers, vinylnaphthalene/acrylic acid copolymers, alkylacrylate/acrylic acid copolymers, alkylmethacrylate/methacrylic acid copolymers, styrene/alkylmethacrylate/methacrylic acid copolymers, styrene/alkylacrylate/acrylic acid copolymers, styrene/phenylmethacrylate/methacrylic acid copolymers and styrene/cyclohexylmethacrylate/methacrylic acid copolymers.

The dispersant which can be used in the first liquid has a weight-average molecular weight of preferably 2,000 to 50,000. If the molecular weight is less than 2,000, the dispersion state of the colored particles is inferior in some cases. If the molecular weight is more than 50,000, in some cases, the viscosity of the liquid is high and the ejection property is inferior. The molecular weight is more preferably 3,500 to 20,000.

The content of the dispersant in the first liquid is 0.01% by mass to 3% by mass. If the content is higher than 3% by mass, in some cases, the viscosity of the liquid is high and the jetting property of the liquid is unstable. If the content is lower than 0.01% by mass, the dispersion quality of the colored particles lowers in some cases. The content is more preferably 0.05% by mass to 2.5% by mass, still more preferably 0.1% by mass to 2% by mass.

The water-soluble solvent used in the first liquid may be a polyhydric alcohol, a polyhydric alcohol derivative, a nitrogen-containing solvent, an alcohol, or a sulfur-containing solvent. Specific examples thereof include: polyhydric alcohols such as ethylene glycol, diethylene glycol, propylene glycol, butylene glycol, triethylene glycol, 1,5-pentanediol, 1,2,6-hexanetriol and glycerine; polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adducts of diglycerine; nitrogen-containing solvent such as pyrrolidone, N-methyl-2-pyrrolidone, cyclohexylpyrrolidone, and triethanolamine; alcohols such as ethanol, isopropyl alcohol, butyl alcohol, and benzyl alcohol; sulfur-containing solvents such as thiodiethanol, thiodiglycerol, sulfolane, and dimethylsulfoxide; propylene carbonate; and ethylene carbonate.

The first liquid may comprise only one water-soluble solvent or two or more water-soluble solvents. The content of the water-soluble solvent in the first liquid is 1% by mass to 60% by mass, preferably, 5% by mass to 40% by mass. If the content is lower than 1% by mass, the optical density is insufficient in some cases. If the content is higher than 60% by mass, in some cases, the viscosity of the liquid is high and the jetting property of the liquid is unstable.

The surface tension of the first liquid is preferably 20 mN/m to 60 mN/m, more preferably, 20 mN/m to 45 mN/m, still more preferably 20 mN/m to 35 mN/m. If the surface tension is lower than 20 mN/m, in some cases, the liquid overflows onto the nozzle face and normal printing cannot be conducted. If the surface tension is higher than 60 mN/m, in some cases, the penetration into the recording medium is slow and the required drying time is long.

The viscosity of the first liquid is preferably 1.2 mPa·s to 25.0 mPa·s, more preferably 1.5 mPa·s or higher but lower than 10.0 mPa·s, still more preferably 1.8 mPa·s or higher but lower than 5.0 mPa·s. If the viscosity is higher than 25.0 mPa·s, the ejection property degrades in some cases. If the viscosity is lower than 1.2 mPa·s, the jetting property degrades in some cases.

Water may be added to the first liquid if the surface tension and viscosity of the liquid are maintained within the above ranges. The amount of water to be added is not particularly limited. The content of water in the first liquid is preferably 10% by mass to 99% by mass, more preferably 30% by mass to 80% by mass.

The second liquid will be described. The second liquid includes a water-soluble solvent, water, and a coagulant which is capable of coagulating or insolubilizing the first liquid.

The coagulant may be a substance which is at least capable of increasing the particle size of the colored particles when mixed with the first liquid, or a substance which is capable of separating the colored particles from the solvent when mixed with the first liquid. The coagulant may be, for example, an inorganic electrolyte, an organic acid, an inorganic acid, or an organic amine.

Examples of the inorganic electrolyte include salts between (alkaline metal ions such as lithium ion, sodium ion, and potassium ion, and multivalent metal ions such as aluminum ion, barium ion, calcium ion, copper ion, iron ion, magnesium ion, manganese ion, nickel ion, tin ion, titanium ion, and zinc ion) and (hydrochloric acid, hydrobromic acid, hydroiodic acid, sulfuric acid, nitric acid, phosphoric acid, thiocyanic acid, organic carboxylic acids such as acetic acid, oxalic acid, lactic acid, fumaric acid, citric acid, salicylic acid, and benzoic acid, and organic sulfonic acids).

Specific examples of the salt include: salts of alkaline metals such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and salts of multivalent metals such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Examples of the organic acid include: arginine, citric acid, glycine, glutamic acid, succinic acid, tartaric acid, cysteine, oxalic acid, fumaric acid, phthalic acid, maleic acid, malonic acid, lysine, malic acid, and compounds represented by the following formula (1); and derivatives thereof.

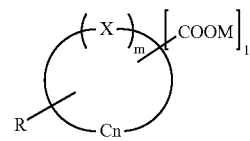

Formula (1)

In the formula (1), X represents O, CO, NH, $NR_1$, S, or $SO_2$ wherein $R_1$ represents an alkyl group. $R_1$ preferably represents $CH_2$, $C_2H_5$, or $C_2H_4OH$. R represents an alkyl group. R preferably represents $CH_2$, $C_2H_5$, or $C_2H_4OH$. The existence of R in the formula (1) is not essential and R may be omitted from the formula. X preferably represents CO, NH, NR, or O, more preferably CO, NH, or O. M represents a hydrogen atom, an alkaline metal, or an amine. M preferably represents H, Li, Na, K, monoethanolamine, diethanolamine, or triethanolamine. M more preferably represents H, Na, or K, still more preferably represents a hydrogen atom. In the formula (1), n represents an integer of 3 to 7. In the formula (1), n preferably represents such an integer that the ring is a 5- or 6-membered ring, more preferably a 5-membered ring. In the formula (1), m represents 1 or 2. The rings of the compounds represented by the formula (1) may be saturated or unsaturated. In the formula (1), 1 represents an integer of 1 to 5.

The compound represented by the formula (1) may be, for example, a compound including a carboxyl group (as a functional group) and a structure selected from the group consisting of furan, pyrrole, pyrroline, pyrrolidone, pyrone, thiophene, indole, pyridine, and quinoline. Specific examples thereof include 2-pyrrolidone-5-carboxylic acid, 4-methyl-4-pentanolide-3-carboxylic acid, furancarboxylic acid, 2-benzofuran carboxylic acid, 5-methyl-2-furan carboxylic acid, 2,5-dimethyl-3-furan carboxylic acid, 2,5-furandicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrolcarboxylic acid, 2,3-dimethylpyrrol-4-carboxylic acid, 2,4,5-trimethylpyrrol-3-propionic acid, 3-hydroxy-2-indolecarboxylic acid, 2,5-dixyo-4-methyl-3-pyrroline-3-propionic acid, 2-pyrrolidinecarboxylic acid, 4-hydroxyproline, 1-methylpyrrolidine-2-carboxylic acid, 5-carboxy-1-methylpyrrolidine-2-acetic acid, 2-pyridinecarboxylic acid, 3-pyridinecarboxylic acid, 4-pyridinecarboxylic acid, pyridinedicarboxylic acid, pyridinetricarboxylic acid, pyridinepentacarboxylic acid, 1,2,5,6-tetrahydro-1-methylnicotinic acid, 2-quinolinecarboxylic acid, 4-quinolinecarboxylic acid, 2-phenyl-4-quinolinecarboxylic acid, 4-hydroxy-2-quinolinecarboxylic acid, and 6-methoxy-4-quinolinecarboxylic acid.

Preferable examples of the organic acid include: citric acid, glycine, glutamic acid, succinic acid, tartaric acid, phthalic acid, pyrrolidonecarboxylic acid, pyronecarboxylic acid, pyrrolcarboxylic acid, furancarboxylic acid, pyridinecarboxylic acid, coumaric acid, thiophenecarboxylic acid, and nicotinic acid; derivatives thereof; and salts thereof. More preferable examples of the organic acid include: pyrrolidone carboxylic acid, pyronecarboxylic acid, pyrrolcarboxylic acid, furancarboxylic acid, pyridinecarboxylic acid, coumaric acid, thiophenecarboxylic acid, and nicotinic acid; derivatives thereof; and salts thereof. Further preferable examples of the organic acid include: pyrrolidone carboxylic acid, pyronecarboxylic acid, furancarboxylic acid, and coumaric acid; derivatives thereof; and salts thereof.

The organic amine compound which can be used in the second liquid may be a primary amine, a secondary amine, a tertiary amine, or a quaternary amine, or a salt thereof. The organic amine compound may be, for example, a tetraalkylammonium, an alkylamine, a benzalkonium, an alkylpyridium, an imidazolium, or a polyamine, or a derivative thereof, or a salt thereof. Specific examples of the organic amine compound include amylamine, butylamine, propanolamine, propylamine, ethanolamine, ethylethanolamine, 2-ethylhexylamine, ethylmethylamine, ethylbenzylamine, ethylenediamine, octylamine, oleylamine, cyclooctylamine, cyclobutylamine, cyclopropylamine, cyclohexylamine, diisopropanolamine, diethanolamine, diethylamine, di-2-ethylhexylamine, diethylenetriamine, diphenylamine, dibutylamine, dipropylamine, dihexylamine, dipentylamine, 3-(dimethylamino)propylamine, dimethylethylamine, dimethylethylenediamine, dimethyloctylamine, 1,3-dimethylbutylamine, dimethyl-1,3-propanediamine, dimethylhexylamine, amino-butanol, amino-propanol, amino-propanediol, N-acetylaminoethyanol, 2-(2-aminoethylamino)-ethanol, 2-amino-2-ethyl-1,3-propanediol, 2-(2-aminoethoxy)ethanol, 2-(3,4-dimethoxyphenyl)ethylamine, cetylamine, triisopropanolamine, triisopentylamine, triethanolamine, trioctylamine, tritylamine, bis(2-aminoethyl)1,3-propanediamine, bis(3-aminopropyl)ethylenediamine, bis(3-aminopropyl) 1,3-propanediamine, bis(3-aminopropyl)methylamine, bis(2-ethylhexyl)amine, bis(trimethylsilyl)amine, butylamine, butylisopropylamine, propanediamine, propyldiamine, hexylamine, pentylamine, 2-methyl-cyclohexylamine, methyl-propylamine, methylbenzylamine, monoethanolamine, laurylamine, nonylamine, trimethylamine, triethylamine, dimethylpropylamine, propylenediamine, hexamethylenediamine, tetraethylenepentamine, diethylethanolamine, tetramethylammonium chloride, tetraethylammonium bromide, dihydroxyethylstearylamine, 2-heptadecenyl-hydroxyethylimidazoline, lauryldimethylbenzylammonium chloride, cetylpyridinium chloride, stearamidemethylpyridium chloride, diallyldimethylammonium chloride polymer, diallylamine polymer, and monoallylamine polymer.

The organic amine compound is more preferably triethanolamine, triisopropanolamine, 2-amino-2-ethyl-1,3-propanediol, ethanolamine, propanediamine, or propylamine.

The second liquid may include only one coagulant or two or more coagulants. The content of the coagulant in the second liquid is preferably 0.01 to 30% by mass, more preferably 0.1 to 15% by mass, further preferably 1 to 15% by mass. If the content of the coagulant in the second liquid is lower than 0.01% by mass, in some cases, the coagulation of the colorant upon contact with the first liquid is insufficient, the optical density is low, and the feathering and intercolor bleed worsen. If the content is higher than 30% by mass, in some cases, the jetting property is inferior and the liquid cannot be jetted normally.

The second liquid may include a colorant. The colorant which can be included in the second liquid is preferably a dye, a pigment having sulfonic acid or sulfonate on its surface, or a self-dispersible pigment. Such colorants are supposed to be hard to coagulate even when the coagulant is present. If such colorants are used in the second liquid, the storage stability of the second liquid does not deteriorate. The dye, pigment having sulfonic acid or sulfonate on its surface, and self-dispersible pigment may be selected from the colorants mentioned in the explanation of the colorant (colored particles) in the first liquid described above.

If the second liquid include a pigment, the volume-average particle size of the pigment is preferably 30 nm to 250 nm, more preferably 50 nm to 200 nm, still more preferably 75 nm to 175 nm. If the volume-average particle size is smaller than 30 nm, the optical density is low in some cases. If the volume-average particle size is larger than 250 nm, the storage stability deteriorates in some cases.

The water-soluble solvent in the second liquid may be selected from the water-soluble solvents mentioned in the description of the water-soluble solvent in the first liquid. The content of the water-soluble solvent in the second liquid is preferably 1% by mass to 60% by mass, preferably 5% by mass to 40% by mass. If the content is lower than 1% by mass, the optical density is insufficient in some cases. If the content is higher than 60% by mass, in some cases, the viscosity of the liquid is high and the jetting property of the liquid is unstable.

The polymer dispersant mentioned in the description of the first liquid may be added to the second liquid.

The surface tension of the second liquid is 20 mN/m to 45 mN/m, more preferably 20 mN/m to 39 mN/m, still more preferably 20 mN/m to 35 mN/m. If the surface tension is lower than 20 mN/m, in some cases, the liquid overflows onto the nozzle face and the printing cannot be conducted normally. If the surface tension is higher than 45 mN/m, in some cases, the penetration takes a long time and the drying time is long.

The viscosity of the second liquid is preferably 1.2 mPa·s to 25.0 mPa·s, more preferably 1.5 mPa·s or higher but lower than 10.0 mPa·s, still more preferably 1.8 mPa·s or higher but lower than 5.0 mPa·s. If the viscosity of the second liquid is higher than 25.0 mPa·s, the ejection property degrades in some cases. If the viscosity is lower than 1.2 mPa·s, the long-term storage stability deteriorates in some cases.

Water may be added to the second liquid if the surface tension and viscosity of the second liquid are maintained in the above range. The amount of water to be added is not particularly limited. The content of water in the second liquid is preferably 10% by mass to 99% by mass, more preferably 30% by mass to 80% by mass.

In the mixture of the first liquid and second liquid, the number of the particles having particle sizes of 5 μm or larger is preferably 1,000/μl or more, more preferably 2,500/μl or more, still more preferably 5,000/μl or more. If the number is less than 1,000/μl, the optical density is insufficient in some cases.

The number of the particles having particle sizes of 5 μm or larger in the mixture is counted in the following manner. The first liquid and second liquid are mixed in a ratio of 1:1 and 2 μl of the mixture is separated while the mixture is stirred. The number of the particles having particle sizes of 5 μm or larger in the 2 μl sample is counted by ACCUSIZER TM770 Optical Particle Sizer (manufactured by Particle Sizing System). In the measurement, the density of the colored particle is used as the parameter representing the density of dispersed particle. The density of the colored particle can be measured by: heating and drying the colored particle liquid dispersion to obtain powder; and measuring the specific gravity of the powder with a specific gravimeter or a specific-gravity bottle.

Additives which can be included in the first liquid or the second liquid will be described.

The first liquid and second liquid each may include a surfactant. A compound including a hydrophilic moiety and hydrophobic moiety is effective as the surfactant in the invention. The surfactant may be an anionic surfactant, a cationic surfactant, an amphoteric surfactant or a nonionic surfactant. The polymer dispersant described above can also used as the surfactant.

The anionic surfactant may be, for example, an alkylbenzene sulfonate, an alkylphenylsulfonate, an alkylnaphthalenesulfonate, a higher fatty acid salt, a salt of a sulfuric ester of a higher alcohol, a salt of a higher aliphatic sulfonic acid, a salt of a sulfuric ester of a higher alcohol ether, a salt of a sulfonic ester of a higher alcohol ether, a salt of a higher alkyl sulfosuccinate, a salt of a higher alkyl phosphoric ester, or a salt of a phosphoric ester of a higher alcohol ethylene oxide adduct. Specific examples thereof include dodecylbenzenesulfonate, kerylbenzenesulfonate, isopropylnaphthalenesulfonate, monobutylphenylphenolmonosulfonate, monobutylbiphenylsulfonate, and dibutylphenylphenoldisulfonate.

Examples of the nonionic surfactant include a polypropyleneglycol ethyleneoxide adduct, a polyoxyethylene nonylphenyl ether, a polyoxyethylene octylphenyl ether, a polyoxyethylene dodecylphenyl ether, a polyoxyethylene alkyl ether, a polyoxyethylene fatty acid ester, a sorbitan fatty acid ester, a polyoxyehylene sorbitan fatty acid ester, a fatty acid alkylolamide, acetyleneglycol, an oxyethylene adduct of acetylene glycol, an aliphatic alkanolamide, a glycerin ester, and a sorbitan ester.

Examples of the cationic surfactant include a salt of a tetraalkylammonium, a salt of an alkylamine, a salt of a benzarconium, a salt of an alkylpyridinium, and a salt of an imidazolium. Specific examples thereof include dihydroxyethylstearylamine, 2-heptadecenyl-hydroxyethylimidazolin, lauryldimethylbenzylammonium chloride, cetylpyridinium chloride, and stearamidemethylpyridium chloride.

Other than the above examples, the surfactant may be a biosurfactant such as spiculosporic acid, rhamnolipid, or lysolecithin.

The content of the surfactant in each of the first liquid and the second liquid is preferably lower than 10% by mass, more preferably 0.01 to 5% by mass, still more preferably 0.01 to 3% by mass. If the amount is 10% by mass or higher, in some cases, the optical density is insufficient and the storage stability of the pigment ink deteriorates.

The first and second liquids each may include other additives which control the characteristics such as ejection property. Such additives may be selected from, for example, polyethyleneimine, polyamines, polyvinylpyrrolidone, polyethyleneglycol, cellulose derivatives such as ethylcellulose and carboxymethyl cellulose, polysaccharides and derivatives thereof, water-soluble polymers, polymer emulsions such as acrylic polymer emulsions, polyurethane emulsions, and hydrophilic latexes, hydrophilic polymer gel, cyclodextrin, macrocyclic amines, dendrimers, crown ethers, urea and derivatives thereof, acetoamide, silicone surfactants, and fluorine-containing surfactants. Other additives may be added in order to control the electric conductivity or pH, such as: alkaline metal compounds (such as potassium hydroxide, sodium hydroxide, and lithium hydroxide); nitrogen-containing compounds (such as ammonium hydroxide, triethanolamine, diethanolamine, ethanolamine, and 2-amino-2-methyl-1-propanol); alkaline earth metal compounds (such as calcium hydroxide); acids (such as sulfuric acid, hydrochloric acid, and nitric acid); and salts of strong acid and weak alkali (such as ammonium sulfate).

The first and second liquids each may further include other additives such as pH stabilizers, antioxidants, fungicides, viscosity adjusting agents, conductive agents, and UV absorbers.

(Ink-jet Recording Method and Ink-jet Recording Apparatus)

The ink-jet recording method of the invention uses the ink-jet ink set of the invention described above. The ink-jet recording method comprises printing in such a manner that the first liquid and the second liquid contact each other on the recording medium. The ink-jet recording apparatus of the invention comprises a recording head which ejects respective liquids in the ink-jet ink set to a recording medium. The ink-jet recording apparatus may be a plain ink-jet recording apparatus or a recording apparatus having a heater which controls the drying of the inks or a recording apparatus which is equipped with a intermediate member transfer system and which conduct the printing on the intermediate member followed by transfer of the printed pattern to a recording medium such as paper.

In the ink-jet recording method and apparatus of the invention, in each case of the first liquid and second liquid, the liquid mass per drop is preferably 25 ng or smaller, more preferably 0.5 ng to 20 ng, still more preferably 2 ng to 8 ng. If the liquid mass per drop is larger than 25 ng, the feathering worsens in some cases. This is supposedly because the contact angle of the first or second liquid with the recording medium changes according to the liquid amount per drop and the drop is more likely to spread on the surface of the sheet as the drop amount increases.

If the ink-jet recording apparatus can change the volume of the drop jetted from one nozzle, the "drop amount" refers to the minimum drop amount printable.

The first and second liquids are provided on the recording medium in such a manner that the two liquids contact each other. When the two liquids contact each other, the ink coagulates owing to the function of the coagulant and printing properties are improved such as the color rendition, evenness in solid image areas, optical density, feathering, intercolor bleed, and drying time. As long as the two liquids contact each other, the manner of providing the liquids is not particularly limited. For example, the two liquids may be provided in such a manner that the two liquids on the recording medium are horizontally adjacent to each other or in such a manner that one of the liquids overlaps the other liquid on the recording medium.

With respect to the order of providing the respective liquids on the recording paper, the second liquid is provided first, then the first liquid is provided. When the second liquid is provided first, it is possible to coagulate the components in the first liquid. The first liquid may be provided at any time after the second liquid is provided. The second liquid is provided preferably within one second from the provision of the first liquid, more preferably within 0.5 seconds from the provision of the first liquid.

In the ink-jet recording method and apparatus of the invention, the ratio of the mass of the first liquid per pixel to the mass of the second liquid per pixel is preferably 1:20 to 20:1, more preferably 1:10 to 10:1, still more preferably 1:5 to 5:1. If the amount of the first liquid relative to the second liquid is excessively small or large, in some cases, the coagulation is insufficient, the optical density is decreased, and the feathering and intercolor bleed are worsened. The term "pixel" used herein refers to an area defined by the minimum distance separable in the main scanning direction at printing and the minimum distance separable in the sub scanning direction at printing. Appropriate ink sets are provided to each pixel, so that appropriate color and image density are obtained to form an image.

From the viewpoint of suppression of feathering and intercolor bleed, the ink-jet recording method and apparatus of the invention preferably utilizes the thermal ink-jet recording method or the piezo ink-jet recording method. The reason is supposedly as follows. In the thermal ink-jet recording method, the ink is heated and has a low viscosity when jetted. The temperature of the ink lowers on the recording sheet to rapidly increase the viscosity of the ink. Therefore, the feathering and intercolor bleed can be suppressed. In the piezo ink-jet method, it is possible to jet a highly viscous liquid. Since the highly viscous liquid is unlikely to spread on the recording medium, the feathering and intercolor bleed can be suppressed.

In an embodiment of the ink-jet recording method (or apparatus) of the invention, the first and second liquids (ink and processing liquid) are supplied (replenished) from an ink tank (including a processing liquid tank) containing the first and second liquids (ink and processing liquid). The ink tank is preferably a cartridge separable from the apparatus. The replenishment of the ink and processing liquid can be easily conducted by changing the cartridge.

In the following, preferable embodiments of the ink-jet recording apparatus of the invention will be described in detail with reference to the figures. In the figures, members having practically the same function are represented by the same numeral and the overlapping explanations are omitted in the following description.

Figure 2:
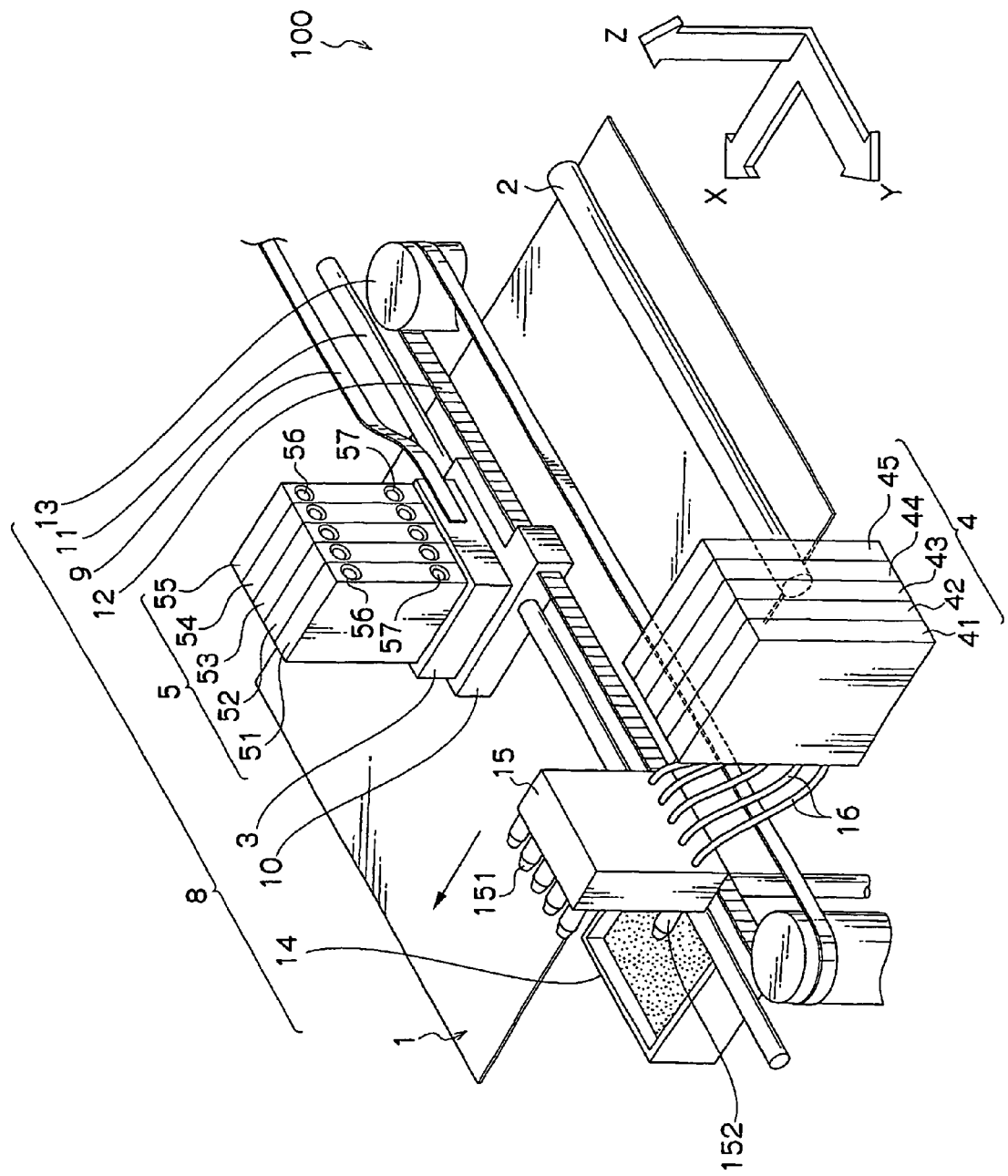
FIG. 2 is a perspective view illustrating the basic interior constitution of the ink-jet recording apparatus of FIG. 1.

FIG. 1 is a perspective view illustrating the external constitution of a preferable embodiment of the ink-jet recording apparatus of the invention. FIG. 2 is a perspective view illustrating the basic interior constitution of the ink-jet recording apparatus (occasionally referred to as "image forming apparatus" hereinafter) of FIG. 1.

The image forming apparatus 100 of this embodiment forms an image by the ink-jet recording method of the invention. As shown in FIGS. 1 and 2, the image forming apparatus 100 comprises an outer cover 6, a tray 7, a conveyance roller 2, an image forming section 8, and a main tank 4. The tray 7 can bear a recording medium 1 upto a predetermined amount. The recording medium 1 may be a plain paper. The conveyance roller 2 can convey the recording medium 1 sheet by sheet to the interior of the image forming apparatus 100. The image forming section 8 can jet the ink and the processing liquid onto the recording medium 1 to form an image. The main ink tank 4 can supply the ink and the processing liquid to their respective sub-tanks 5 in the image forming section 8.

The conveyance roller 2 is a device for conveying sheets. The device comprises a pair of rotatable rollers disposed in the image forming apparatus 100. The rollers pinch the recording medium 1 on the tray 7 and convey a specified amount of the recording medium 1 sheet by sheet to the interior of the image forming apparatus 100 at a specified timing.

The image forming section 8 forms an ink image on the surface of the recording medium 1. The image forming section 8 comprises a recording head 3, a sub-tank 5, a feeder signal cable 9, a carriage 10, a guide rod 11, a timing belt 12, a driving pulley 13, and a maintenance unit 14. The recording head 3 and the sub-tank 5 are collectively represented by a sign "5(3)".

The sub-tank 5 includes sub-tanks 51 to 55. The sub-tanks 51 to 55 each contain an ink in a different color or a processing liquid. The ink or processing liquid in the respective sub-tanks can be jetted from the recording head. For example, the sub-tanks 51 to 55 may respectively include a black ink (K), a yellow ink (Y), a magenta ink (M), a cyan ink (C), and a processing liquid. The inks are the first liquids and the processing liquid is the second liquid. If the second liquid includes a colorant, it is not necessary for the sub-tank 5 to include a separate sub-tank for the processing liquid.

The sub-tanks 51 to 55 each have an exhaust opening 56 and a replenishment opening 57. When the recording head 3 moves to a stand-by position (or a replenishment position), a exhaust pin 151 and a replenishment pin 152 are plugged respectively in the exhaust opening 56 and the replenishment opening 57, so that the sub-tank 5 and a replenishment device 15 are connected. The replenishment device 15 is connected to the main tank 4 by a replenishment tubes 16. The replenishment device 15 sends inks and the processing liquid from the main tank 4 to the sub-tank 5 through the replenishment openings 57 so as to replenish the inks and the processing liquid in the sub-tank 5.

The main tank 4 includes main tanks 41 to 45 each containing an ink in a different color or a processing liquid. For example, the main tanks 41 to 45 may include respectively a black ink (K), a yellow ink (Y), a magenta ink (M), a cyan ink (C), and a processing liquid. The inks are the first liquids and the processing liquid is the second liquid. Each of the main tanks is independently separable from the image forming apparatus 100. If the second liquid includes a colorant, it is not necessary for the main tank 4 to include a separate main tank for the processing liquid.

The feeder signal cable 9 and the sub-tank 5 are connected to the recording head 3. When an image recording information is transmitted from outside to the recording head 3 by the feeder signal cable 9, the recording head 3 suctions predetermined amounts of the inks and processing liquids from the sub-tanks 51 to 55 and jets the inks and processing liquids to the surface of the recording medium 1, based on the image recording information. The feeder signal cable 9 supplies the recording head 3 with the power required for driving the recording head 3, in addition to transmitting the image recording information.

The recording head 3 is disposed on the carriage 10. The carriage 10 is connected to the timing belt 12, which is further connected to the guide rod 11 and the driving pulley 13. According to this structure, the recording head 3 can move along the guide rod 11 and can move in the main scanning direction Y. The main scanning direction Y is parallel to the surface of the recording medium 1 and perpendicular to the sub scanning direction X. The sub scanning direction is the direction of the transportation of the recording medium 1. A direction Z is an upward direction which is perpendicular to the directions X and Y.

The image forming apparatus 100 further comprises a control element (not shown) which controls the driving timing of the recording head 3 and the driving timing of the carriage 10 on the basis of the image recording information. The control device enables continuous image formation on a specified area on the recording medium 1, which is transported in the transportation direction X at a specified velocity, the image formation being conducted based on the image recording information.

The maintenance unit 14 is connected to a decompressor (not shown) by a tube. The maintenance unit 14 is also connected to the nozzle part of the recording head 3. The maintenance unit 14 suctions ink in the nozzles of the recording head 3 by using a reduced pressure. The maintenance unit 14 can remove unnecessary ink in the nozzles during the operation of the image forming device 100 and can prevent the evaporation of the ink through the nozzles when the image forming device 100 is not operating.

Figure 3:
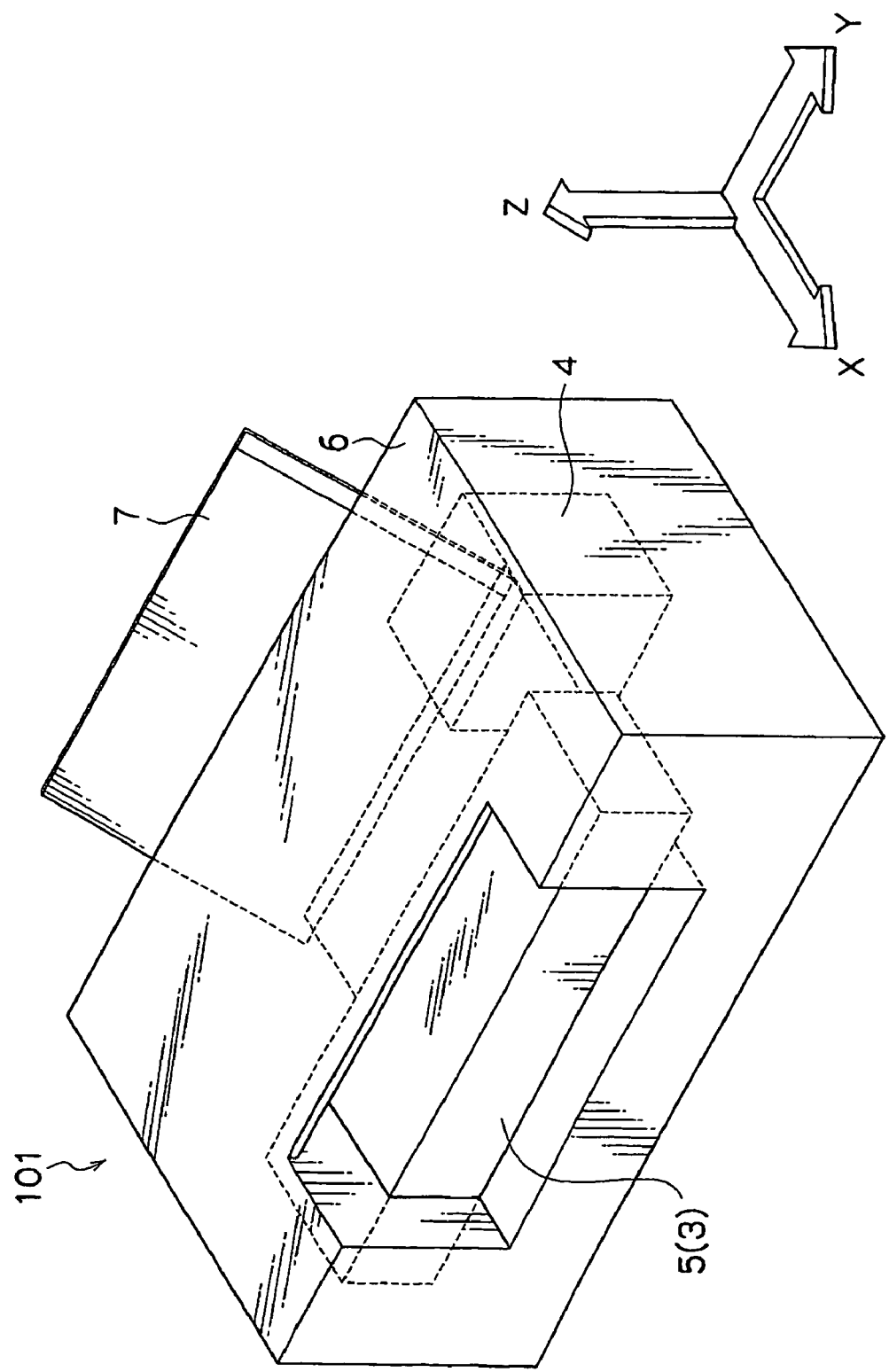
FIG. 3 is a perspective view illustrating the external constitution of another preferable embodiment of the ink-jet recording apparatus of the invention.
Figure 4:
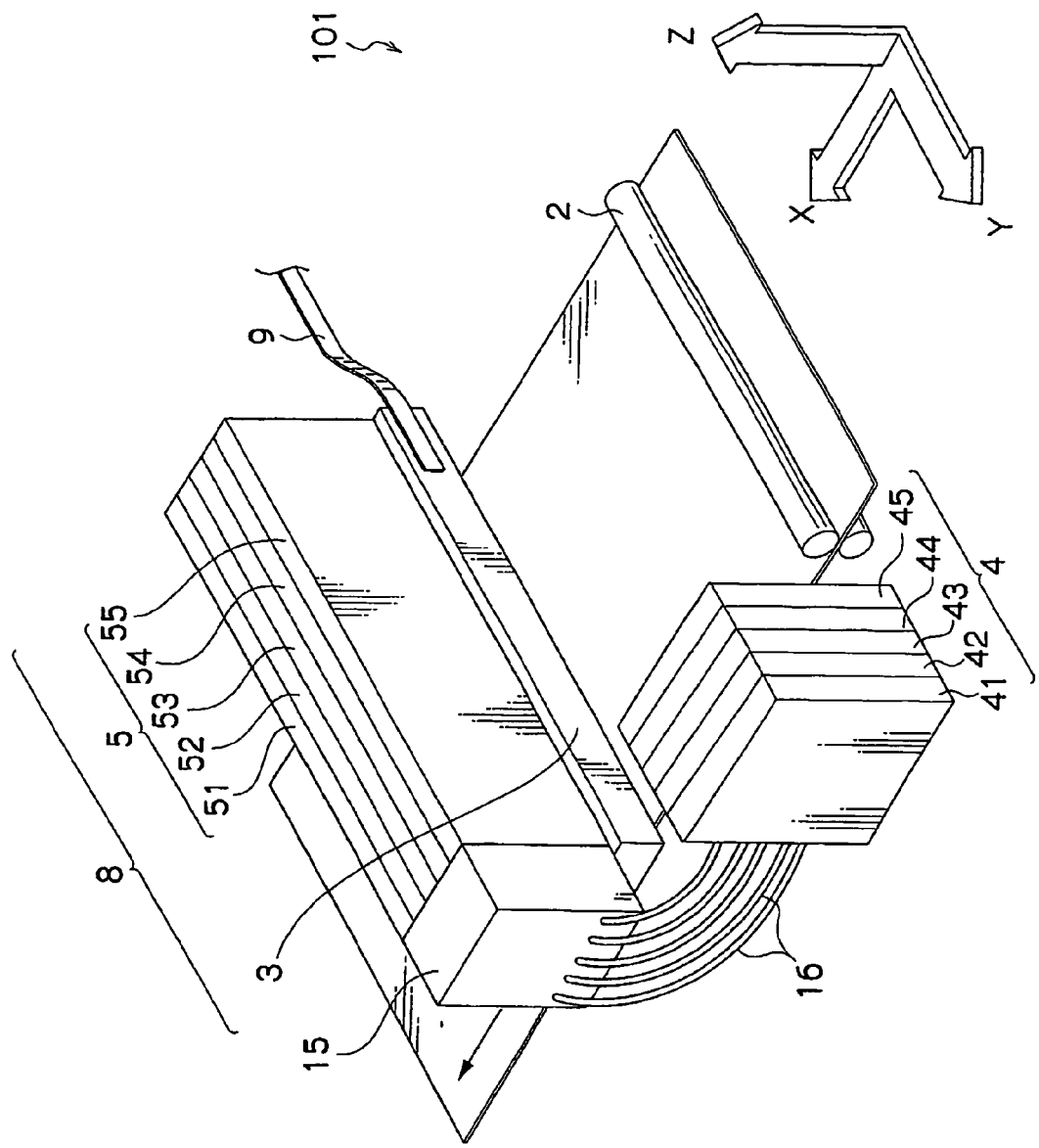
FIG. 4 is a perspective view illustrating the basic internal constitution of the ink-jet recording apparatus of FIG. 3.

FIG. 3 is a perspective view illustrating the external constitution of another preferable embodiment of the ink-jet recording apparatus of the invention. FIG. 4 is a perspective view illustrating the basic interior constitution of the ink-jet recording apparatus (occasionally referred to as "image forming apparatus" hereinafter) of FIG. 3. The image forming apparatus 101 of this embodiment forms an image by the ink-jet recording method of the invention.

In the image forming apparatus 101 shown in FIGS. 3 and 4, the width of the recording head 3 is equal to or larger than the width of the recording medium 1. The image forming apparatus 101 does not have a carriage mechanism. The image forming apparatus 101 has a sheet conveyance system which conveys sheets in the sub scanning direction (the direction of the transportation of the recording medium 1, represented by the arrow X). Although the sheet conveyance system is transportation rollers 2 in this embodiment, the system may be a belt-type sheet conveyance system.

The sub-tanks 51 to 55 are arranged along the direction of the sub scanning direction X. Similarly, the nozzles (not shown) which jet inks of respective colors and the processing liquid are also arranged in the sub scanning direction. The other details of the constitution is the same as in the image forming apparatus 100 shown in FIGS. 1 and 2. In the FIGS. 3 and 4, the sub-tank 5 has such a constitution that the sub-tank 5 is always connected to the replenishment device 15 since the recording head 3 does not move. However, the sub-tank 5 may be connected to the replenishment device 15 only at the replenishment of the ink or processing liquid.

The image forming apparatus 101 shown in FIGS. 3 and 4 conducts printing on the recording medium 1 in the direction (the main scanning direction) of the width of the recording medium 1 in a lump with the recording head 3. Therefore, the constitution of the apparatus is simpler than in the case of the apparatus having a carriage system, and the printing speed is also higher.

EXAMPLES

In the following, the present invention will be explained more specifically with reference to examples. It should be noted that the examples should not be construed as limiting the invention. In the examples, the term "part" refers to "part by mass" unless specified otherwise.

<Method of Producing Colored Particles>

Core particles (core substance), shell particles (shell substance), and a resin are put in a high-speed stirrer in respectively predetermined amounts, and stirred for 20 minutes. As a result, a mixture is obtained in which the shell particles adhere to the core particles electrostatically.

The mixture is put in a hybridizer and treated at a rotor revolution speed of 6,000 rpm at 65° C. for 60 minutes to obtain colored particles.

The obtained colored particles are sufficiently rinsed with ion-exchanged water. Then, the water is removed and the particles are dried at 70° C. for 24 hours. In this way, the colored particles having a core-shell structure are obtained.

<Method 1 of Dispersing Colored Particles>

The colored particles are added to ion-exchanged water in such an amount that the solid of the particles occupies 20% by mass of the total amount. The resultant liquid is treated with an ultrasonic homogenizer so that the colored particles are dispersed. The obtained liquid dispersion is further subjected to centrifugal treatment (8,000 rpm×30 minutes) and the debris (about 20% of the initial amount of the particles) is removed. In this way, the colored particle liquid dispersion is obtained.

<Method 2 of Dispersing Colored Particles>

The colored particles and a dispersant are added to a predetermined amount of ion-exchanged water in such amounts that the content of the particles in the mixture is 20% by mass and the content of the dispersant in the mixture is 3% by mass. The mixture is stirred, then treated with an ultrasonic homogenizer so that the colored particle are dispersed. The liquid dispersion is further subjected to a centrifugal treatment (8,000 rpm×30 minutes) and the debris (about 20% of the initial amount of the particles) is removed. In this way, the colored particle liquid dispersion is obtained.

<Method of Preparing Liquid>

The colored particle liquid dispersion, a water-soluble organic solvent, a surfactant, ion-exchanged water, and the like are mixed and stirred such that the mixture having a predetermined composition is obtained. The obtained mixture liquid is filtrated with a 5 μm filter. In this way, the desired liquid is prepared.

(Colored Particle A)

Colored particles are prepared according to the method of producing colored particles described above.

| Composition | |
|---|---|
| CABOJET-300 (powder, manufactured by Cabot Corporation) (shell substance) | 300 parts |
| Styrene-Acrylic acid-Sodium Acrylate copolymer (resin) | 20 parts |
| Polymethylmethacrylate (core substance: weight-average molecular weight = 20,000) | 100 parts |

In the obtained colored particles, the thickness of the shell part of is 10.4 nm, the ratio of the thickness of the shell part to the radius of the core part is 0.42, and the ratio of the mass of the shell part to the mass of the core part is 2.8.

(Colored Particle B)

Colored particles are prepared according to the method of producing colored particles described above.

| Composition | |
|---|---|
| BLACK PEARLS L (manufactured by Cabot Corporation) (shell substance) | 200 parts |
| Styrene-Acrylic acid-Sodium Acrylate copolymer (resin) | 20 parts |
| Polystyrene (core substance: weight-average molecular weight = 700,000) | 100 parts |

In the obtained colored particles, the thickness of the shell part of is 7.6 nm, the ratio of the thickness of the shell part to the radius of the core part is 0.30, and the ratio of the mass of the shell part to the mass of the core part is 1.7.

(Colored Particle C)

Colored particles are prepared according to the method of producing colored particles described above.

| Composition | |
|---|---|
| C.I. Pigment Blue 15:3 (shell substance) | 4,500 parts |
| Styrene-Acrylic acid-Sodium Acrylate copolymer (resin) | 15 parts |
| Polymethylmethacrylate (core substance: weight-average molecular weight = 50,000) | 100 parts |

In the obtained colored particles, the thickness of the shell part of is 56 nm, the ratio of the thickness of the shell part to the radius of the core part is 2.2, and the ratio of the mass of the shell part to the mass of the core part is 45.

(Colored Particle D)

Colored particles are prepared according to the method of producing colored particles described above.

| Composition | |
|---|---|
| C.I. Pigment Red 122 (shell substance) | 120 parts |
| Styrene-Acrylic acid-Sodium Acrylate copolymer (resin) | 25 parts |
| Polystyrene (core substance: weight-average molecular weight = 100,000) | 100 parts |

In the obtained colored particles, the thickness of the shell part of is 5.8 nm, the ratio of the thickness of the shell part to the radius of the core part is 0.23, and the ratio of the mass of the shell part to the mass of the core part is 1.2.

(Colored Particle E)

Colored particles are prepared according to the method of producing colored particles described above.

| Composition | |
|---|---|
| C.I. Pigment Yellow 74 (shell substance) | 150 parts |
| Silane coupling agent (resin) | 20 parts |
| Silica (core substance) | 100 parts |

In the obtained colored particles, the thickness of the shell part of is 11 nm, the ratio of the thickness of the shell part to the radius of the core part is 0.28, and the ratio of the mass of the shell part to the mass of the core part is 1.5.

(Colored Particle F)

Colored particles are prepared according to the method of producing colored particles described above.

| Composition | |
|---|---|
| C.I. Pigment Blue 15:3 (shell substance) | 4,500 parts |
| Styrene-Acrylic acid-Sodium Acrylate copolymer (resin) | 15 parts |
| Polymethylmethacrylate (core substance: weight-average molecular weight = 50,000) | 10 parts |

In the obtained colored particles, the thickness of the shell part of is 72 nm, the ratio of the thickness of the shell part to the radius of the core part is 6.5, and the ratio of the mass of the shell part to the mass of the core part is 584.

(Colored Particle G)

Colored particles are prepared according to the method of producing colored particles described above.

| Composition | |
|---|---|
| C.I. Pigment Blue 15:3 (shell substance) | 400 parts |
| Styrene-Acrylic acid-Sodium Acrylate copolymer (resin) | 10 parts |
| Polymethylmethacrylate (core substance: weight-average molecular weight = 50,000) | 2,100 parts |

In the obtained colored particles, the thickness of the shell part of is 4 nm, the ratio of the thickness of the shell part to the radius of the core part is 0.19, and the ratio of the mass of the shell part to the mass of the core part is 0.94.

(Colored Particle H)

Colored particles are prepared according to the method of producing colored particles described above.

| Composition | |
|---|---|
| C.I. Pigment Blue 15:3 (shell substance) | 23,550 parts |
| Styrene-Acrylic acid-Sodium Acrylate copolymer (resin) | 120 parts |
| Polymethylmethacrylate (core substance: weight-average molecular weight = 50,000) | 10 parts |

In the obtained colored particles, the thickness of the shell part of is 110 nm, the ratio of the thickness of the shell part to the radius of the core part is 11, and the ratio of the mass of the shell part to the mass of the core part is 2355.

(Colored Particle I)

Colored particles are prepared according to the method of producing colored particles described above.

| Composition | |
|---|---|
| C.I. Pigment Blue 15:3 (shell substance) | 2,260 parts |
| Styrene-Acrylic acid-Sodium Acrylate copolymer (resin) | 15 parts |
| Polymethylmethacrylate (core substance: weight-average molecular weight = 50,000) | 100 parts |

In the obtained colored particles, the thickness of the shell part of is 40 nm, the ratio of the thickness of the shell part to the radius of the core part is 1.6, and the ratio of the mass of the shell part to the mass of the core part is 22.6.

(Liquid A)

A liquid is prepared according to the method 1 of dispersing colored particles and the method of preparing liquid described above.

| Composition | |
|---|---|
| Colored Particle A | 7% by mass |
| Diethylene glycol | 10% by mass |
| Propylene glycol | 10% by mass |
| Diethyleneglycol monobutyl ether | 5% by mass |
| Acetyleneglycol ethylene oxide adduct | 1% by mass |
| Ion-exchanged water | Remainder |

The obtained liquid has a pH of 7.9, a surface tension of 31 mN/m, and a viscosity of 2.9 mPa·s. The particles in the liquid have a volume-average particle size of 124 nm.

(Liquid B)

A liquid is prepared according to the method 2 of dispersing colored particles and the method of preparing liquid described above.

| Composition | |
|---|---|
| Colored Particle B | 5% by mass |
| Diethylene glycol | 10% by mass |
| Glycerin | 10% by mass |
| Diethyleneglycol monobutyl ether | 5% by mass |
| Acetyleneglycol ethylene oxide adduct | 1% by mass |
| Ion-exchanged water | Remainder |

The obtained liquid has a pH of 8.2, a surface tension of 31 mN/m, and a viscosity of 3.1 mPa·s. The particles in the liquid have a volume-average particle size of 113 nm.

(Liquid C)

A liquid is prepared according to the method 2 of dispersing colored particles and the method of preparing liquid described above.

| Composition | |
|---|---|
| Colored Particle C | 4% by mass |
| Diethylene glycol | 10% by mass |
| Sulfolane | 10% by mass |
| Diethyleneglycol monobutyl ether | 5% by mass |
| Acetyleneglycol ethylene oxide adduct | 1% by mass |
| Ion-exchanged water | Remainder |

The obtained liquid has a pH of 8.1, a surface tension of 31 mN/m, and a viscosity of 3.2 mPa·s. The particles in the liquid have a volume-average particle size of 121 nm.

(Liquid D)

A liquid is prepared according to the method 2 of dispersing colored particles and the method of preparing liquid described above.

| Composition | |
|---|---|
| Colored Particle D | 4.5% by mass |
| Diethylene glycol | 10% by mass |
| Propylene glycol | 10% by mass |
| Diethyleneglycol monobutyl ether | 5% by mass |
| Acetyleneglycol ethylene oxide adduct | 1.5% by mass |
| Ion-exchanged water | Remainder |

The obtained liquid has a pH of 8.0, a surface tension of 31 mN/m, a viscosity of 3.0 mPa·s, and a volume-average particle size of 118 nm.

(Liquid E)

A liquid is prepared according to the method 2 of dispersing colored particles and the method of preparing liquid described above.

| Composition | |
|---|---|
| Colored Particle E | 6% by mass |
| Diethylene glycol | 13% by mass |
| Propylene glycol | 12% by mass |
| Diethyleneglycol monobutyl ether | 5% by mass |
| Acetyleneglycol ethylene oxide adduct | 1.5% by mass |
| Ion-exchanged water | Remainder |

The obtained liquid has a pH of 7.9, a surface tension of 31 mN/m, a viscosity of 3.5 mPa·s, and a volume-average particle size of 118 nm.

(Liquid F)

A liquid is prepared according to the method of preparing liquid described above.

| Composition | |
|---|---|
| CABOJET 300 (manufactured by Cabot Corporation) | 4% by mass |
| Styrene-acrylic acid-potassium acrylate copolymer | 0.5% by mass |
| Diethylene glycol | 20% by mass |
| Diethyleneglycol monobutyl ether | 5% by mass |
| Acetyleneglycol ethylene oxide adduct | 1% by mass |
| Ion-exchanged water | Remainder |

The obtained liquid has a pH of 8.3, a surface tension of 30 mN/m, a viscosity of 3.1 mPa s, and a volume-average particle size of 125 nm.

(Liquid G)

A liquid is prepared according to the method of preparing liquid described above.

| Composition | |
|---|---|
| CABOJET 260 (manufactured by Cabot Corporation) | 4% by mass |
| Styrene-acrylic acid-potassium acrylate copolymer | 0.5% by mass |
| Glycerin | 15% by mass |
| Ethylene glycol | 5% by mass |
| Propylene glycol | 5% by mass |
| Acetyleneglycol ethylene oxide adduct | 1% by mass |
| Ion-exchanged water | Remainder |

The obtained liquid has a pH of 8.4, a surface tension of 31 mN/m, a viscosity of 2.9 mPa s, and a volume-average particle size of 108 nm.

(Liquid H)

The following components are mixed.

| Composition | |
|---|---|
| Diethylene glycol | 27% by mass |
| 2-pyrrolidone-5-carboxylic acid | 10% by mass |
| Sodium hydroxide | 1.75% by mass |
| Acetyleneglycol ethylene oxide adduct | 1% by mass |
| Ion-exchanged water | Remainder |

The obtained liquid has a pH of 3.8, a surface tension of 31 mN, and a viscosity of 3.2 mPa·s.

(Liquid I)

The following components are mixed.

| Composition | |
|---|---|
| Diethylene glycol | 27% by mass |
| magnesium nitrate | 10% by mass |
| Acetyleneglycol ethylene oxide adduct | 1% by mass |
| Ion-exchanged water | Remainder |

The obtained liquid has a pH of 4.0, a surface tension of 31 mN, and a viscosity of 3.0 mPa·s.

(Liquid J)

A liquid is prepared according to the method 2 of dispersing colored particles and the method of preparing liquid described above.

| Composition | |
|---|---|
| Colored Particle F | 4.5% by mass |
| Diethylene glycol | 12% by mass |
| Propylene glycol | 10% by mass |
| Acetyleneglycol ethylene oxide adduct | 1% by mass |
| Ion-exchanged water | Remainder |

The obtained liquid has a pH of 8.0, a surface tension of 31 mN/m, a viscosity of 3.2 mPa s, and a volume-average particle size of 182 nm.

(Liquid K)

A liquid is prepared according to the method 2 of dispersing colored particles and the method of preparing liquid described above.

| Composition | |
|---|---|
| Colored Particle G | 4.5% by mass |
| Diethylene glycol | 12% by mass |
| Propylene glycol | 10% by mass |
| Acetyleneglycol ethylene oxide adduct | 1% by mass |
| Ion-exchanged water | Remainder |

The obtained liquid has a pH of 8.2, a surface tension of 31 mN/m, a viscosity of 3.4 mPa·s, and a volume-average particle size of 62 nm.

(Liquid L)

A liquid is prepared according to the method 2 of dispersing colored particles and the method of preparing liquid described above.

| Composition | |
|---|---|
| Colored Particle H | 4.5% by mass |
| Diethylene glycol | 12% by mass |
| Propylene glycol | 10% by mass |
| Acetyleneglycol ethylene oxide adduct | 1% by mass |
| Ion-exchanged water | Remainder |

The obtained liquid has a pH of 8.1, a surface tension of 31 mN/m, a viscosity of 3.0 mPa·s, and a volume-average particle size of 231 nm.

(Liquid M)

A liquid is prepared according to the method 2 of dispersing colored particles and the method of preparing liquid described above.

| Composition | |
|---|---|
| Colored Particle I | 4.5% by mass |
| Diethylene glycol | 12% by mass |
| Propylene glycol | 10% by mass |
| Acetyleneglycol ethylene oxide adduct | 1% by mass |
| Ion-exchanged water | Remainder |

The obtained liquid has a pH of 8.3, a surface tension of 30 mN/m, a viscosity of 2.9 mPa·s, and a volume-average particle size of 115 nm.

Examples 1-9 and Comparative examples 1-3

Printing is conducted using the ink sets shown in Table 1. In the printing, a 800 dpi, 256 nozzle experimental print head (drop amount: 14 ng) is used and the second liquid (processing liquid) is jetted onto FX-P paper (manufactured by Fuji Xerox Co., Ltd.). The first liquid (ink) is jetted onto the second liquid. In this way, the printing pattern is printed. The condition at the printing is a general condition (temperature: 23±0.5° C., humidity: 55±5% R.H). The ratio between the mass of the first liquid per pixel and the mass of the second liquid per pixel is 1:0.2. After the printing, the sample is left in the general condition for 24 hours. Then, evaluations other than evaluations on the drying time and the long-term stability are conducted on the sample (the sample for the evaluations on the drying time and the long-term stability is specified below). For an evaluation on the intercolor bleeding, printing is conducted using the liquids (colored inks) shown in the Tables so that the printing patterns of respective inks are adjacent to each other. The obtained sample is left in the general condition for 24 hours and used for the evaluation on the intercolor bleeding.

Color Rendition

The lightness of the printed areas in the printed pattern is measured using an X LIGHT 967 (manufactured by X Light Photonics Inc.).

—Evaluation Criteria (Black Ink)—
A: The lightness (L*) is 20 or higher but lower than 25
B: The lightness (L*) is 15 or higher but lower than 20
C: The lightness (L*) is lower than 15

—Evaluation Criteria (Color Ink)—
A: The lightness (L*) is 45 or higher but lower than 50
B: The lightness (L*) is 30 or higher but lower than 45
C: The lightness (L*) is lower than 30

Unevenness in Solid Image Area

The unevenness in solid-pattern printed areas is compared with boundary samples and the unevenness is evaluated sensorially.

—Evaluation Criteria—
A: Unevenness is hardly observable
B: Slight unevenness is observable at the acceptable level
C: Unevenness is unacceptably severe Optical Density The optical density of printed areas in the printed pattern is measured using X LIGHT 404 (manufactured by X Light Photonics Inc.).

—Evaluation Criteria (Black Ink)—
A: The optical density is 1.4 or higher
B: The optical density is 1.3 or higher but lower than 1.4
C: The optical density is lower than 1.3

—Evaluation Criteria (Color Ink)—
A: The optical density is 1.1 or higher
B: The optical density is 1.0 or higher but lower than 1.1
C: The optical density is lower than 1.0

Intercolor Bleed

Such a pattern is printed that different colors are adjacent to each other and the intercolor bleed at the boundary of colors is compared with predetermined boundary samples and evaluated sensorially. The evaluation on the intercolor bleed is conducted in this way.

—Evaluation Criteria—
A: Intercolor bleed is slight
B: Intercolor bleed is observable but within the acceptable level
C: Intercolor bleed is unacceptably severe Feathering Thin line pattern is printed, and the degree of the feathering is compared with boundary samples and evaluated sensorially.

—Evaluation Criteria—
A: Feathering is slight
B: Feathering is observable but within the acceptable level
C: Feathering is unacceptably severe Drying Time A 100% coverage pattern is printed. When a predetermined time has passed since the printing, another FX-P paper is placed on and pressed to the printed pattern at a pressure of $1.9 \times 10^4$ N/m². The predetermined time is changed to determine the time required for the printed pattern to dry to such a degree that no liquid is transferred to the FX-P paper pressed on the printed pattern. The required time is considered as the drying time.

—Evaluation Criteria—
A: The drying time is shorter than 1 second.
B: The drying time is 1 second or longer but shorter than 5 seconds.
C: The drying time is 5 seconds or longer.

Long-Term Storage Stability

The ink viscosity and the ink surface tension are measured. Then, the first and second liquids are left in an evaluation condition (temperature: 23±0.5° C., humidity: 55×5% R.H) for 3 years. Then, the ink viscosity of the first liquid and the ink surface tension of the first liquid are measured again. The differences between the initial values and the values after the storage are evaluated.

—Evaluation Criteria—
A: The difference between the characteristic value after the storage and the initial characteristic value is smaller than 5% of the initial characteristic value.
B: The difference between the characteristic value after the storage and the initial characteristic value is 5% or larger but smaller than 15% of the initial characteristic value.
C: The difference between the characteristic value after the storage and the initial characteristic value is 15% or larger of the initial characteristic value.

Jetting Property

The jetting property is evaluated by: sequentially printing $1 \times 10^5$ pulses using the liquids; and measuring the change in the drop velocity over time.

—Evaluation Criteria—
A: The drop velocity after $1 \times 10^5$ pulses is 90% or higher of the initial drop velocity.
B: The drop velocity after $1 \times 10^5$ pulses is 80% or higher but lower than 90% of the initial drop velocity.
C: The drop velocity after $1 \times 10^5$ pulses is lower than 80% of the initial drop velocity.

<Summary of the Evaluation>

The results of the evaluations are summarized in Table 2. As shown in Table 2, Examples 1-5 exhibit excellent characteristics with respect to the color rendition, evenness in solid image areas, optical density, feathering, intercolor bleed, drying time, and long-term stability, wherein in Examples 1-5, the first and second liquids are provided on the recording medium such that the two liquids contact each other, the first liquid includes a dispersant, a water-soluble solvent, water, and colored particles having a core-shell structure whose core part comprises an uncolored component and whose shell part comprises a colored component, and the second liquid includes a water-soluble solvent, water, and a coagulant capable of coagulating or insolubilizing the components in the first liquid.

According to the invention, an ink-jet ink set, an ink-jet ink tank, an ink-jet recording method and an ink-jet recording apparatus are provided which are superior with respect to the color rendition, unevenness in solid image areas, optical density, feathering, intercolor bleed, drying time and long-term stability.

What is claimed is:

1. An ink-jet ink set comprising a first liquid and a second liquid, wherein: the first liquid includes a colored particle, a dispersant, a water-soluble solvent, and water;

TABLE 1

| | | | Colored Particle | | | Liquid 1 | | | Liquid 2 | |
|---|---|---|---|---|---|---|---|---|---|---|
| | | | | Ratio of the | | Volume- | | | | |
| | Liquid 1 | Liquid 2 | | Shell Thickness (nm) | Shell Thickness to the Core Thickness | Mass Ratio of the Shell to the Core | average Particle Size (nm) | Surface tension (mN/m) | Viscosity (mPa·s) | Surface tension (mN/m) | Viscosity (mPa·s) |
| Ex. 1 | Liquid A | Liquid H | A | 10.4 | 0.42 | 2.8 | 124 | 31 | 2.9 | 31 | 3.2 |
| Ex. 2 | Liquid B | Liquid I | B | 7.6 | 0.30 | 1.7 | 113 | 31 | 3.1 | 31 | 3.0 |
| Ex. 3 | Liquid C | Liquid H | C | 56 | 2.2 | 45 | 121 | 31 | 3.2 | 31 | 3.2 |
| Ex. 4 | Liquid D | Liquid H | D | 5.8 | 0.23 | 1.2 | 118 | 31 | 3.0 | 31 | 3.2 |
| Ex. 5 | Liquid E | Liquid H | E | 11 | 0.28 | 1.5 | 118 | 31 | 3.5 | 31 | 3.2 |
| Ex. 6 | Liquid J | Liquid H | F | 72 | 6.5 | 584 | 182 | 31 | 3.2 | 31 | 3.2 |
| Ex. 7 | Liquid K | Liquid H | G | 4 | 0.19 | 0.94 | 62 | 31 | 3.4 | 31 | 3.2 |
| Ex. 8 | Liquid L | Liquid H | H | 110 | 11 | 2355 | 231 | 31 | 3.0 | 31 | 3.2 |
| Ex. 9 | Liquid M | Liquid H | I | 40 | 1.6 | 23 | 115 | 30 | 2.9 | 31 | 3.2 |
| Comp. Ex. 1 | Liquid F | Liquid H | — | (125) | — | — | 125 | 30 | 3.1 | 31 | 3.2 |
| Comp. Ex. 2 | Liquid G | Liquid H | — | (108) | — | — | 108 | 31 | 2.9 | 31 | 3.2 |
| Comp. Ex. 3 | Liquid A | — | A | 10.4 | 0.42 | 2.8 | 124 | 31 | 2.9 | — | — |

TABLE 2

| | Color rendition | Unevenness in Solid Image Areas | Optical Density | Feathering | Intercolor Bleed (Kind of Adjacent Printing Liquid) | Drying Time | Long-term Storage Stability | Jetting Property |
|---|---|---|---|---|---|---|---|---|
| Ex. 1 | A | A | A | A | A (Liquid E) | A | A | A |
| Ex. 2 | A | A | A | A | A (Liquid E) | A | A | A |
| Ex. 3 | A | A | A | A | A (Liquid E) | A | A | A |
| Ex. 4 | A | A | A | A | A (Liquid E) | A | A | A |
| Ex. 5 | A | A | A | A | A (Liquid A) | A | A | A |
| Ex. 6 | A | A | A | A | A (Liquid E) | A | A | B |
| Ex. 7 | A | A | A | A | A (Liquid E) | A | A | A |
| Ex. 8 | A | A | A | A | A (Liquid E) | A | A | B |
| Ex. 9 | A | A | A | A | A (Liquid E) | A | A | A |
| Comp. Ex. 1 | B | B | A | A | A (Liquid E) | A | A | A |
| Comp. Ex. 2 | B | B | A | A | A (Liquid E) | A | A | A |
| Comp. Ex. 3 | A | A | C | B | A (Liquid E) | A | A | A | the second liquid includes a water-soluble solvent, water, and a coagulant capable of coagulating or insolubilizing the first liquid;

the colored particle has a core-shell structure in which a core part is coated with a shell part;

the core part comprises an uncolored component; and the shell part comprises a colored component.

2. The ink-jet ink set according to claim 1, wherein a thickness of the shell part is 5 nm to 100 nm.

3. The ink-jet ink set according to claim 1, wherein a ratio of a thickness of the shell part to a radius of the core part is in a range of 0.2 to 2.5.

4. The ink-jet ink set according to claim 1, wherein a mass ratio of the shell part to the core part is in a range of 1 to 50.

5. The ink-jet ink set according to claim 1, wherein the uncolored component is an inorganic substance or a polymer having a weight-average molecular weight of 10,000 or higher.

6. The ink-jet ink set according to claim 1, wherein the colored component is a pigment or a dye.

7. The ink-jet ink set according to claim 1, wherein the first liquid further includes a resin having a carboxylic group.

8. The ink-jet ink set according to claim 1, wherein the colored component is a dye, a self-dispersible pigment, or a pigment having a sulfonic acid group or sulfonate group on its surface.

9. The ink-jet ink set according to claim 1, wherein a volume-average particle size of the colored particle is 30 nm to 250 nm.

10. The ink-jet ink set according to claim 1, wherein a surface tension of the first liquid is 20 mN/m to 60 mN/m.

11. The ink-jet ink set according to claim 1, wherein a number of particles having particle sizes of 5 µm or larger in a mixture of the first liquid and the second liquid is at least 1,000/µl.

12. An ink-jet ink tank containing the ink-jet ink set of the claim 1.

13. An ink-jet recording method comprising:

providing the ink-jet ink set of claim 1; and ejecting the first liquid and the second liquid from an ink-jet recording head onto a surface of a recording medium in such a manner that the first liquid and the second liquid contact each other on the surface.

14. The ink-jet recording method according to claim 13, wherein the first liquid and the second liquid are each provided on the recording medium in an amount of 25 ng per drop or less.

15. The ink-jet recording method according to claim 13, wherein a mass ratio of an amount of the second liquid to be provided for one pixel to an amount of the first liquid to be provided for one pixel is 1:10 to 10:1.

16. The ink-jet recording method according to claim 13, wherein the ink-jet ink set is included in a ink-jet ink tank.

17. An ink-jet recording apparatus comprising a recording head, wherein the recording head jets respective liquids of the ink-jet ink set of claim 1.

18. The ink-jet recording apparatus according to claim 17, wherein the first liquid and the second liquid are each provided on the recording medium in an amount of 25 ng per drop or less.

19. The ink-jet recording apparatus according to claim 17, wherein a mass ratio of an amount of the second liquid to be provided for one pixel to an amount of the first liquid to be provided for one pixel is 1:10 to 10:1.

20. The ink-jet recording apparatus according to claim 17, wherein the ink-jet recording apparatus further comprises an ink-jet ink tank and the ink-jet ink tank contains the ink-jet ink set.

* * * * *